(No Model.)
J. A. TAYLOR, Jr.
TRUCK OR RICE FARM PLOW.
No. 477,971. Patented June 28, 1892.
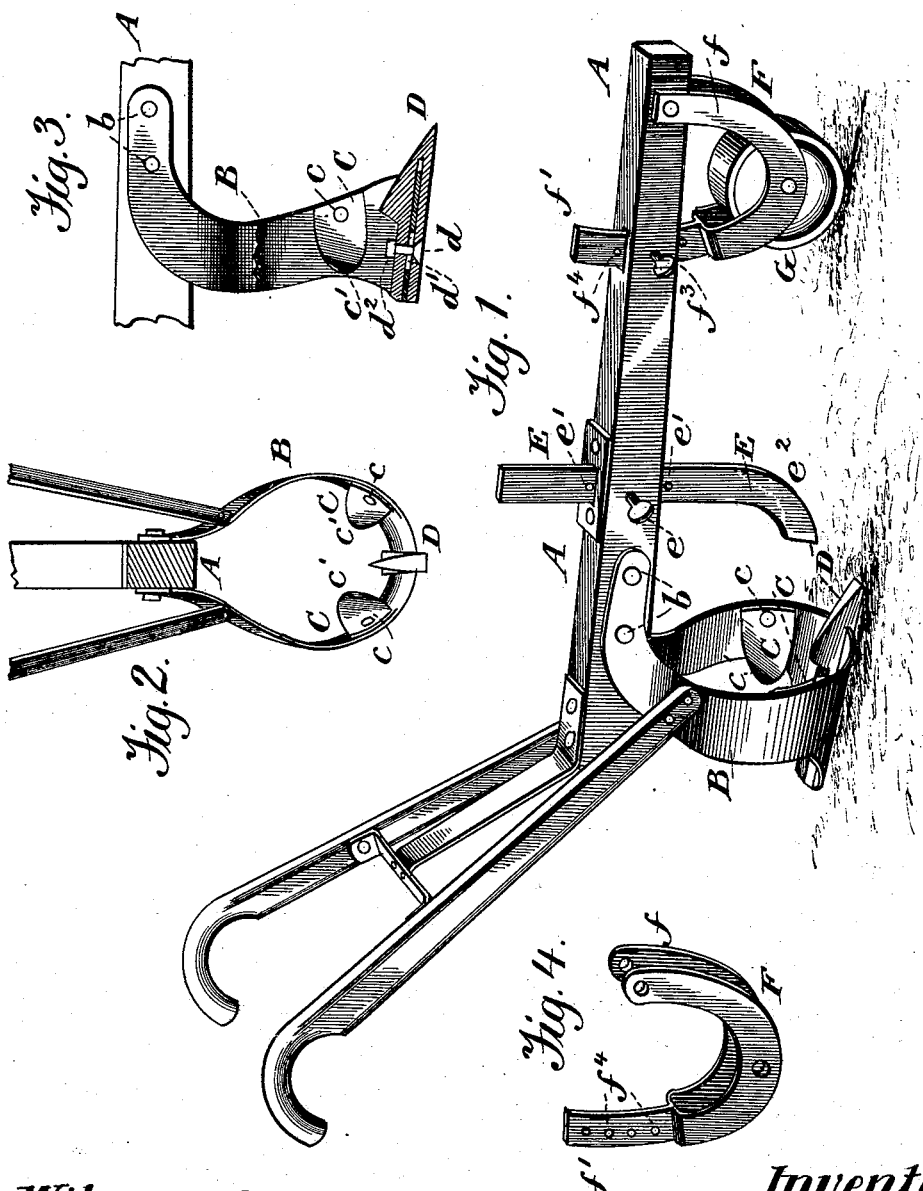
Witnesses:
A. Ruppert.
E. Ense.
Inventor:
Joseph A. Taylor, Jr.
by G. H. W. T. Howard
Asso. Attys.

UNITED STATES PATENT OFFICE.

JOSEPH A. TAYLOR, JR., OF SAVANNAH, GEORGIA.

TRUCK OR RICE FARM PLOW.

SPECIFICATION forming part of Letters Patent No. 477,971, dated June 28, 1892.

Application filed October 31, 1891. Serial No. 410,546. (No model.)

*To all whom it may concern:*

Be it known that I, JOSEPH A. TAYLOR, Jr., of Savannah, in the county of Chatham and State of Georgia, have invented certain new and useful Improvements in Plows, of which the following is a specification, reference being had to the accompanying drawings, and to the letters of reference marked thereon.

My invention relates to plows specially adapted for used in the cultivation of rice or "truck," its object being to prevent sodding or throwing dirt on the plants, to turn in guano without leaving any exposed to the sun, and to leave the earth loose and thin enough to dry and kill grass and weeds; and the invention consists of the several details of construction and arrangement of parts, as fully set forth in the following specification, and particularly pointed out in the claims.

In the drawings, Figure 1 is a perspective view of my improved plow. Fig. 2 is a front view of the hoe, showing the plow-beam in section and the plow-handles broken away. Figs. 3 and 4 are detached details, Fig. 3 being partly in section.

Similar letters of reference indicate similar parts in the respective figures.

A represents the plow-beam, and B a round or tubular hoe secured to the beam by bolts $b$.

C C are shares secured at their forward ends to the inner surface of the sides of the hoe B by rivets or screws $c$, the two shares being opposite each other. The rear ends of the shares are curved inwardly and downwardly, as best shown in Fig. 3, at $c'$, for the purpose of turning the soil inwardly to the center of the row.

D is a point adjustably secured to the bottom of the hoe by a bolt $d$ and nut $d'$, the bolt passing through the shank of the point D and an elongated hole $d'$ in the hoe. (See Fig. 3.)

E is a gage vertically adjustable in the plow-beam A and held in position by the pin $e$, passing through the plow-beam and either one of a series of holes $e'$ in the gage E. The lower end of the gage E is bent, as shown at $e^2$, and is intended to bear on the surface of the ground just forward of the hoe to regulate the depth of the cut.

To the forward end of the plow-beam a semi-circular frame F is pivoted at one end $f$, its other end $f'$ passing through a hole $f^2$ in the beam and being vertically adjustable therein. This end of the frame is secured in the desired position by a pin $f^3$, which passes through the plow-beam and either one of a series of holes $f^4$ in the frame. A wheel G is journaled in the frame F to support the forward end of the plow, and its vertical adjustment aids the gage E in regulating the depth of cut of the hoe.

From the foregoing description the operation of the plow will be readily understood.

Having described my invention I claim—

1. In a plow, the combination, with a round or tubular hoe, of shares attached to its inner surface on opposite sides thereof, substantially as described.

2. In a plow, the combination, with a round hoe, of shares attached to its inner surface on opposite sides thereof, the rear ends of said shares being curved inwardly and downwardly, substantially as described.

3. In a plow, the combination, with a round hoe, of shares attached to its inner surface on opposite sides thereof and a point secured to the bottom of the hoe, substantially as described.

4. In a plow, a round hoe, combined with shares attached to its inner surface on opposite sides thereof and a point adjustably secured to the bottom of the hoe, substantially as described.

JOS. A. TAYLOR, JR.

Witnesses:
 A. H. MACDONELL,
 JOHN S. SCHLEY.